United States Patent
Liu et al.

(10) Patent No.: US 10,638,060 B2
(45) Date of Patent: Apr. 28, 2020

(54) COLOR CORRECTION OF RGBIR SENSOR STREAM BASED ON RESOLUTION RECOVERY OF RGB AND IR CHANNELS

(71) Applicant: INTEL CORPORATION, Santa Clara, CA (US)

(72) Inventors: Hsin-I Liu, Sunnyvale, CA (US); Yongshen Ni, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 261 days.

(21) Appl. No.: 15/194,854

(22) Filed: Jun. 28, 2016

(65) Prior Publication Data

US 2017/0374299 A1 Dec. 28, 2017

(51) Int. Cl.
| | |
|---|---|
| *H04N 5/33* | (2006.01) |
| *G06T 5/00* | (2006.01) |
| *H04N 9/04* | (2006.01) |
| *H04N 1/60* | (2006.01) |
| *G06T 5/50* | (2006.01) |
| *H04N 1/40* | (2006.01) |
| *G06T 3/40* | (2006.01) |

(52) U.S. Cl.
CPC ........... *H04N 5/332* (2013.01); *G06T 3/4015* (2013.01); *G06T 5/002* (2013.01); *G06T 5/50* (2013.01); *H04N 1/40068* (2013.01); *H04N 1/60* (2013.01); *H04N 1/6008* (2013.01); *H04N 9/045* (2013.01); *G06T 2207/10024* (2013.01); *G06T 2207/20012* (2013.01); *H04N 2209/046* (2013.01)

(58) Field of Classification Search
CPC .... H04N 5/332; H04N 9/045; H04N 5/23229; H04N 13/025; H04N 9/69; H04N 9/735; G06K 9/4604; G06K 9/4652; G06T 2207/10024; G06T 5/002; G06T 5/20; G06T 11/001

See application file for complete search history.

(56) References Cited

U.S. PATENT DOCUMENTS 9,523,608 B2 * 12/2016 Xu .......................... G01J 3/513
2004/0161145 A1 * 8/2004 Embler ................. G06T 3/4007
382/165

(Continued)

*Primary Examiner* — Jingge Wu
(74) *Attorney, Agent, or Firm* — Finch & Maloney PLLC

(57) ABSTRACT

Techniques are provided for color correction of image frames, received from a hybrid RGBIR sensor, using resolution recovery of the red, green, blue (RGB), and infra-red (IR) channels. The color correction is to compensate for IR contamination of the RGB channels. A methodology implementing the techniques according to an embodiment includes a demosaic operation on the RGBIR image frame to generate full resolution red, green, blue, and IR frames. The demosaic operation includes filtering to extract Chroma and Luma components of the RGBIR image to reconstruct the full resolution images. The method also includes calculating an IR weighting factor for the pixels of each of the full resolution RGB frames, and correcting for IR contamination of those pixels by subtracting a scaled value of the corresponding pixels from the full resolution IR frame. The scaled value is based on the IR weighting factor associated with the pixel to be corrected.

24 Claims, 10 Drawing Sheets
(3 of 10 Drawing Sheet(s) Filed in Color)

(56) References Cited

U.S. PATENT DOCUMENTS

| | | | |
|---|---|---|---|
| 2007/0153099 A1* | 7/2007 | Ohki | H04N 5/332 348/234 |
| 2007/0153335 A1* | 7/2007 | Hosaka | H04N 1/58 358/463 |
| 2008/0111894 A1* | 5/2008 | Tanimoto | H04N 5/33 348/222.1 |
| 2009/0016607 A1* | 1/2009 | Chono | G06T 3/4015 382/181 |
| 2011/0019004 A1* | 1/2011 | Ohmori | H04N 9/045 348/164 |
| 2011/0261425 A1* | 10/2011 | Yamaguchi | H04N 1/1017 358/512 |
| 2012/0200734 A1* | 8/2012 | Tang | H04N 5/23245 348/223.1 |
| 2013/0229530 A1* | 9/2013 | Hubel | H04N 17/02 348/187 |
| 2014/0307098 A1* | 10/2014 | Kang | H04N 13/239 348/164 |
| 2014/0320689 A1* | 10/2014 | Ohba | G06T 3/4038 348/222.1 |
| 2015/0062347 A1* | 3/2015 | Jin | H04N 5/332 348/164 |
| 2015/0207962 A1* | 7/2015 | Sugimoto | H04N 19/117 382/261 |
| 2015/0256800 A1* | 9/2015 | Sugiyama | H04N 9/045 348/279 |
| 2016/0156855 A1* | 6/2016 | Boulanger | G06T 1/20 348/164 |
| 2016/0198103 A1* | 7/2016 | Tanaka | G03B 15/05 348/164 |
| 2016/0255290 A1* | 9/2016 | Wajs | H04N 9/64 348/164 |
| 2016/0343152 A1* | 11/2016 | Hay | G06T 7/337 |
| 2016/0373676 A1* | 12/2016 | Zhang | H04N 5/374 |
| 2017/0064275 A1* | 3/2017 | Chen | H04N 9/045 |
| 2017/0163853 A1* | 6/2017 | Hata | H04N 5/217 |
| 2017/0237887 A1* | 8/2017 | Tanaka | G03B 7/091 348/164 |
| 2017/0330053 A1* | 11/2017 | Park | G06T 5/002 |
| 2018/0041714 A1* | 2/2018 | Hayashi | H04N 1/409 |

* cited by examiner

COLOR CORRECTION OF RGBIR SENSOR STREAM BASED ON RESOLUTION RECOVERY OF RGB AND IR CHANNELS

BACKGROUND

Hybrid RGBIR sensors allow for the capture of red (R), green (G), blue (B), and infrared (IR) components of incoming light. These sensors may be incorporated in cameras and other imaging devices for a variety of purposes. For example, they may improve image quality by providing increased brightness and tonality. They may also allow for the creation of artistic photographic effects by imaging features of a scene that would otherwise be invisible to conventional RGB sensors. Additionally, they can be useful in scientific applications ranging from minerology to forensics. A problem arises, however, in that the IR component can contaminate the RGB channels and introduce color errors in the resulting image which are generally difficult to correct.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
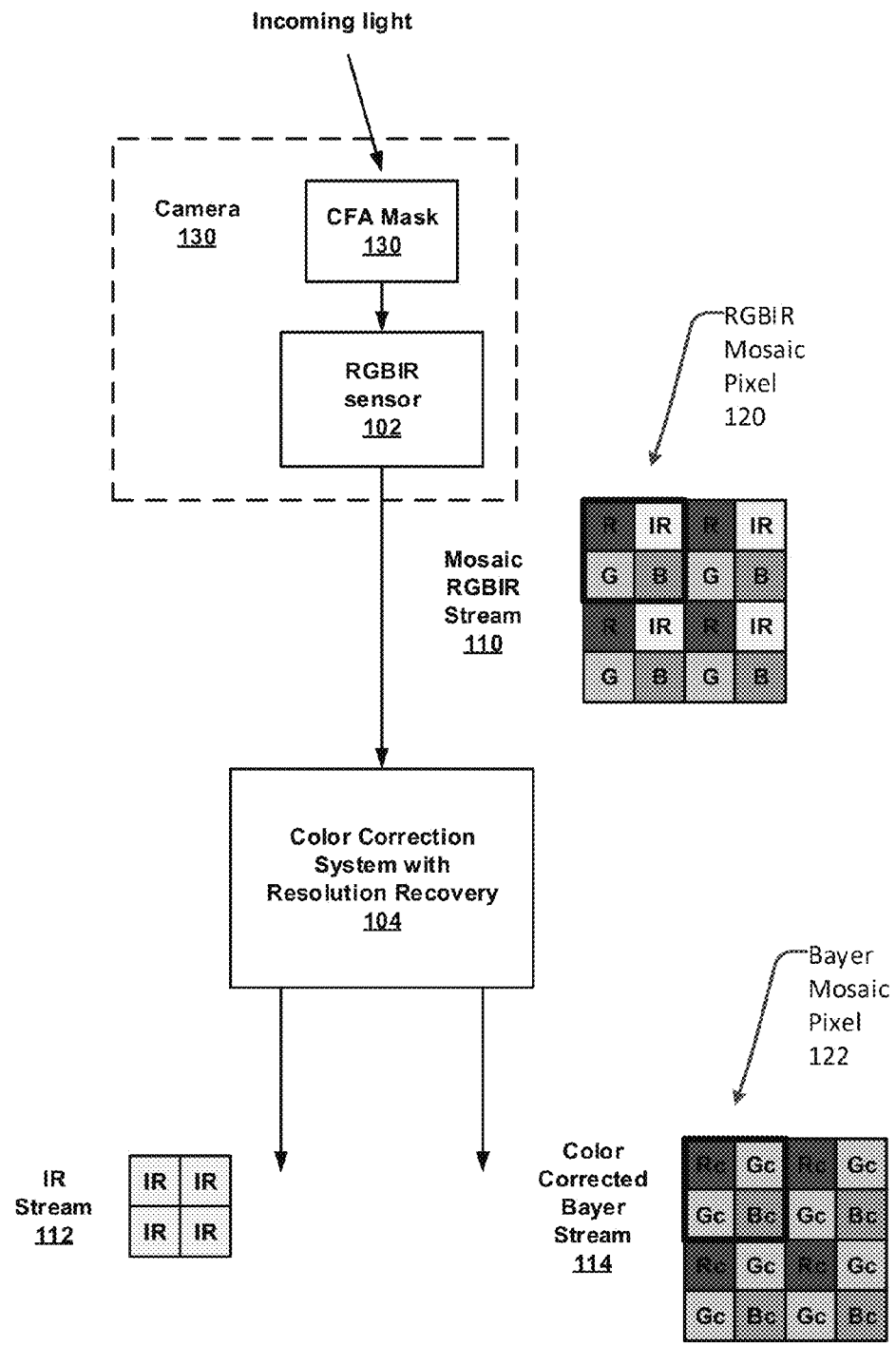
FIG. 1 is a top level block diagram of an implementation of an RGBIR color correction system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for color correction of an RGBIR (red-green-blue-infrared) sensor stream. The stream comprises a sequence of image frames, each frame composed of RGBIR mosaic pixels generated by a hybrid RBGIR sensor. The color correction is used to compensate for IR contamination of the color (RBG) channels, which is a problem in a hybrid sensor. The technique employs full resolution recovery, based on a demosaic process applied to the RGBIR images, to exploit high frequency correlations between the RGB and IR channels, as will be explained in greater detail below. The IR contamination is calibrated and removed from the full resolution images. The color corrected full resolution images may then be used as is, or may be reconstructed into a mosaic Bayer pattern which can be used in image processing applications.

In accordance with an embodiment, the disclosed techniques can be implemented, for example, in a computing system or an image capture and processing system, or a software product executable or otherwise controllable by such systems. The system or product is configured to perform a demosaic operation on the RGBIR image frame to generate full resolution red, green, blue, and IR frames. The demosaic operation includes filtering to extract Chroma and Luma components of the RGBIR image to reconstruct the full resolution images. The system may also calculate an IR weighting factor for the pixels of each of the full resolution RGB frames, and correct for IR contamination of those pixels by subtracting a scaled value of the corresponding pixels from the full resolution IR frame. The scaled value is based on the IR weighting factor associated with the pixel to be corrected. The IR weighting factors are based on a response of red, green, and blue channels of the RGBIR sensor to light in the IR spectrum. In some embodiments, the IR weighting factors are further based on the spatial location of the pixel within the full resolution frame, for example weighting may vary from the center to the corners of the frame.

The techniques described herein may allow for improved color reproduction of images generated by hybrid RGBIR sensors and such color corrected images generally meet or exceed industry specified image quality standards, according to an embodiment. The techniques may support any number of imaging applications, such as video conferencing or facial recognition for secure login or surveillance systems, to name a few examples. Additionally, these techniques can be implemented in any desired platform including, for example, a mobile device such as a laptop, tablet or smartphone that includes an RGBIR capable camera or can receive such RGBIR images. These techniques may further be implemented in hardware or software or a combination thereof.

FIG. 1 is a top level block diagram 100 of an implementation of an RGBIR color correction system, configured in accordance with certain embodiments of the present disclosure. A hybrid RGBIR sensor 102 is configured to capture images in both the color spectrum (red-green-blue or RGB) and in the infrared (IR) spectrum. In some embodiments, the RGBIR sensor may be incorporated into a camera or camera system 130. The camera may in turn be incorporated into a platform such as, for example, a mobile phone, tablet, or laptop, etc.

The sensor 102 is configured to generate a stream of mosaic RGBIR image frames 110. Each mosaic RGBIR image frame 110 includes a number of RGBIR mosaic pixels 120, one instance of which is indicated by the square with emphasized outline. In some embodiments, a 2×2 color filter array (CFA) mask 130 is installed in front of the sensor to filter incoming light into red, green, blue, and infrared components before reaching a grid of photodetectors such that each photodetector channel generates one of the R, G, B, and IR regions of the mosaic pixel 120. This is illustrated in more detail in FIG. 4, where it can be seen that the CFA masking 130 creates an RGBIR mosaic pixel 120 that is composed of one red pixel R(0,0), one green pixel G(0,1), one blue pixel B(1,1), and one IR pixel IR(1,0), each extracted from full resolution versions of the red 320a, green 320b, blue 320c, and IR 322 channels.

Figure 2:
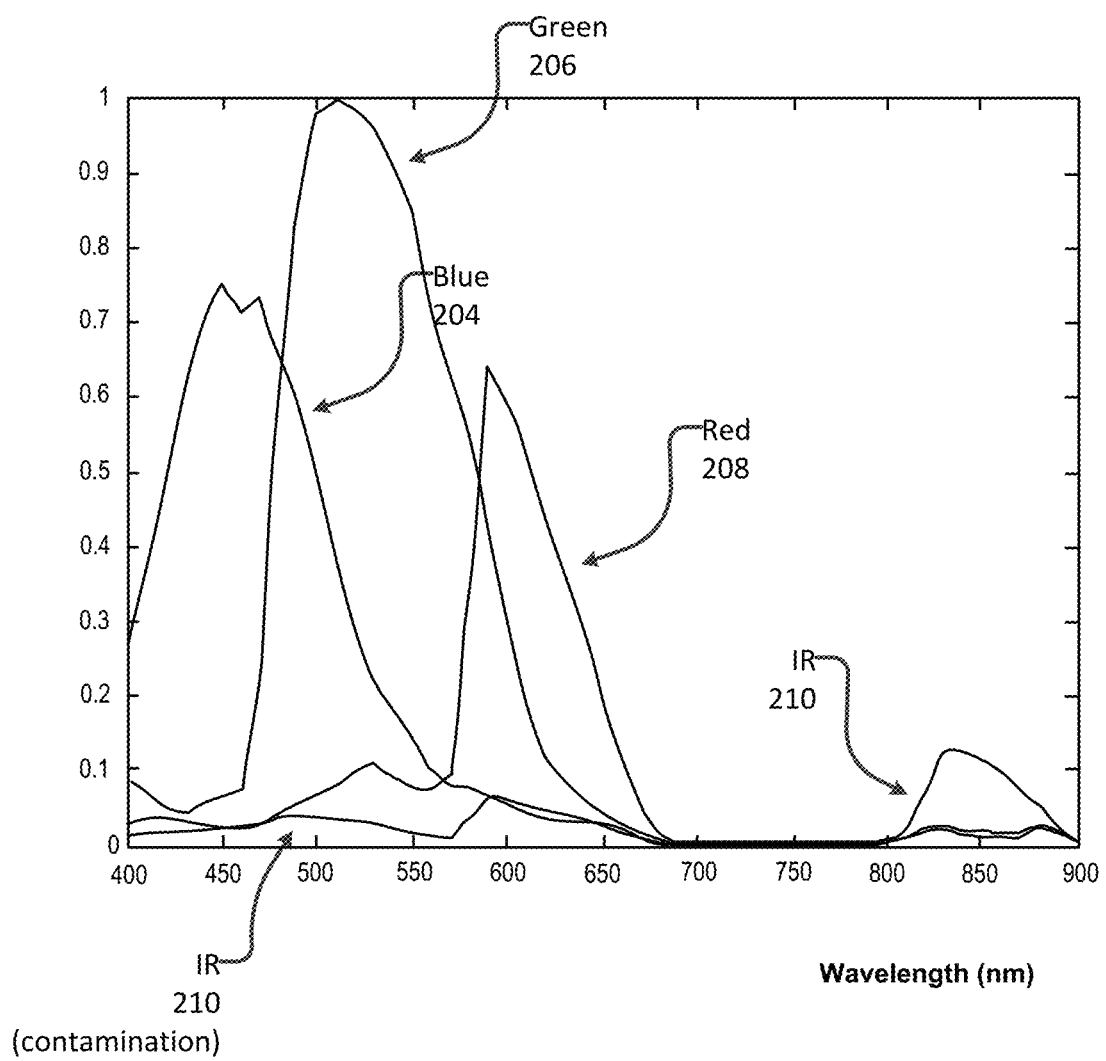
FIG. 2 illustrates example RGBIR relative quantum efficiency curves, in accordance with certain embodiments of the present disclosure.

The resulting mosaic pixels 120 are generally degraded, however, by contamination of the IR signal into the R, G, and B regions. This is illustrated, for example, by the relative quantum efficiency curves 202, shown in FIG. 2, which provide a measurement of the sensitivity of the sensor photodetectors to light over the indicated wavelength ranges. As can be seen, the R, G, and B pixel values (208, 206, and 204) are contaminated by the IR component 210. Thus, to accurately reconstruct the R, G, and B signals in the visible light spectral range, the IR component needs to be removed from the sensor output.

Color correction system 104 is configured to remove the IR contamination from the RGBIR mosaic sensor output using a resolution recovery technique, as will be explained in greater detail below. In some embodiments, color correction system 104 may generate a color corrected Bayer stream 114 (e.g., in an RGB mosaic pattern 122) along with an extracted IR stream 112 of IR pixels. Although the example illustrations of the mosaic RGBIR stream frames 110, and the corresponding color corrected Bayer stream frames 114, show only 4 mosaic pixels 120, 122, in practice, relatively large numbers of such pixels will be generated and processed. In some embodiments, image frames may typically include millions of mosaic pixels.

Figure 3:
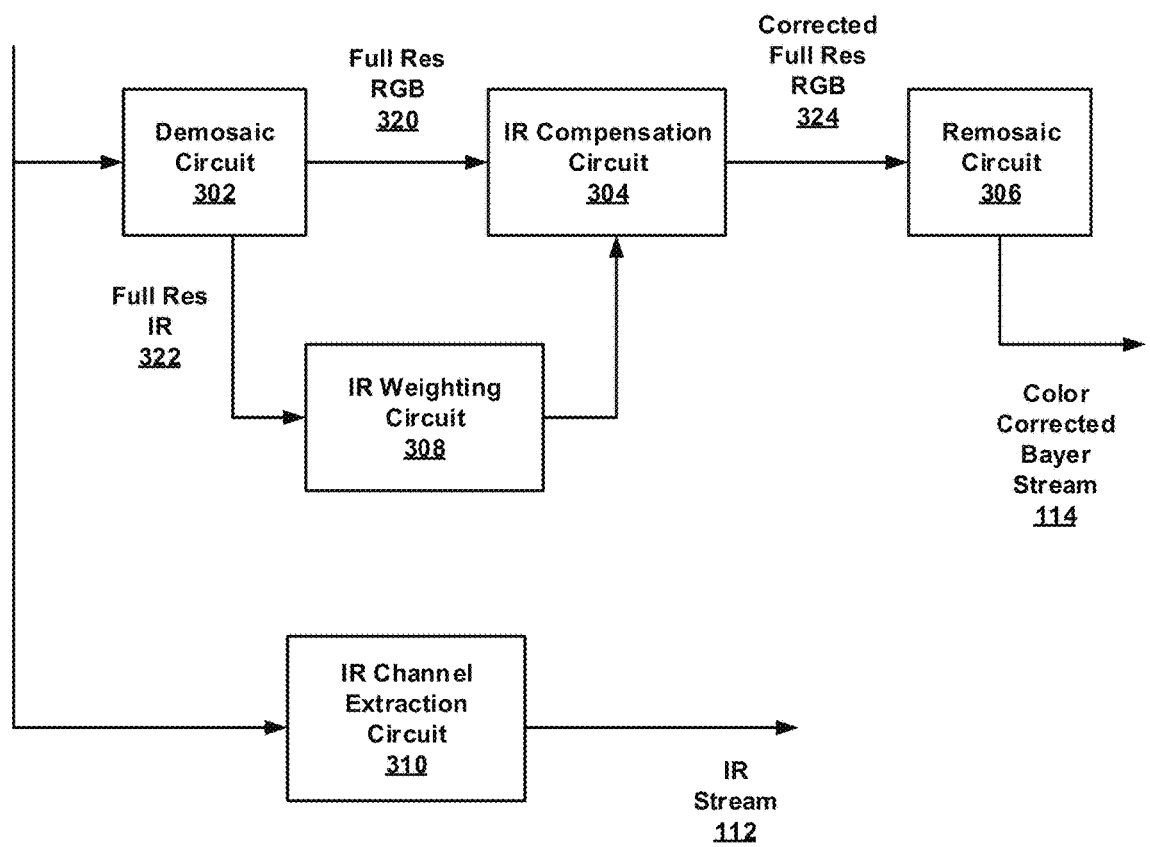
FIG. 3 is a more detailed block diagram of an RGBIR color correction system, configured in accordance with certain embodiments of the present disclosure.

FIG. 3 is a more detailed block diagram of an RGBIR color correction system 104, configured in accordance with certain embodiments of the present disclosure. The RGBIR color correction system 104 is shown to include a demosaic circuit 302, an IR weighting circuit 308, an IR compensation circuit 304, a remosaic circuit 306, and an IR channel extraction circuit 310.

Figure 4:
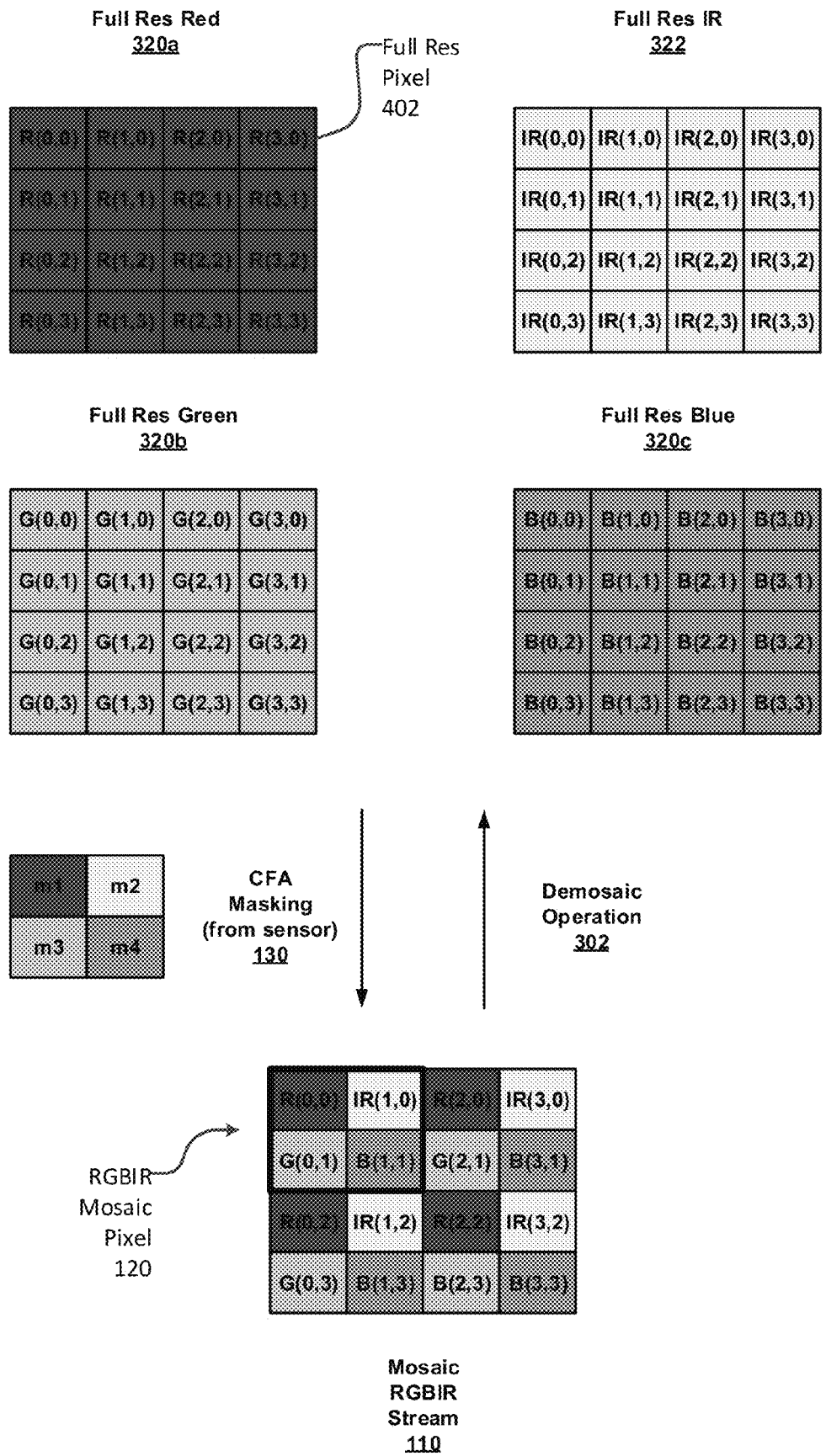
FIG. 4 illustrates examples of full resolution and mosaic images, in accordance with certain embodiments of the present disclosure.

The demosaic circuit 302 may be configured to perform a demosaic operation on the stream of RGBIR image frames 110 to reconstruct and recover full resolution versions of the red frame 320a, green frame 320b, blue frame 320c, and IR frame 322, as illustrated in FIG. 4. The operation of demosaic circuit 302 will be explained in greater detail below with reference to FIGS. 4 and 5.

The IR weighting circuit 308 may be configured to calculate an IR weighting factor for each of the pixels of each of the full resolution red, green, and blue frames. The IR weighting factors are based on a calibrated response of the red, green, and blue channels of the RGBIR sensor to light in the IR spectrum and provide a measure of the degree of contamination of the color pixels by the IR light.

Figure 7:
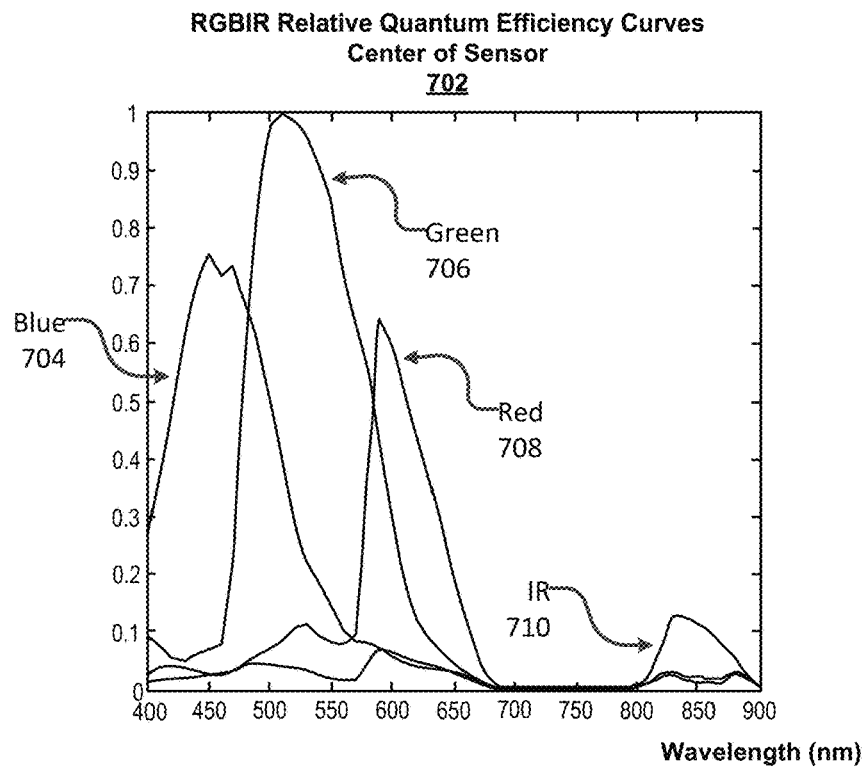
FIG. 7 illustrates a comparison of example RGBIR relative quantum efficiency curves for the center and the corner of an RGBIR sensor, in accordance with certain embodiments of the present disclosure
Figure 7:
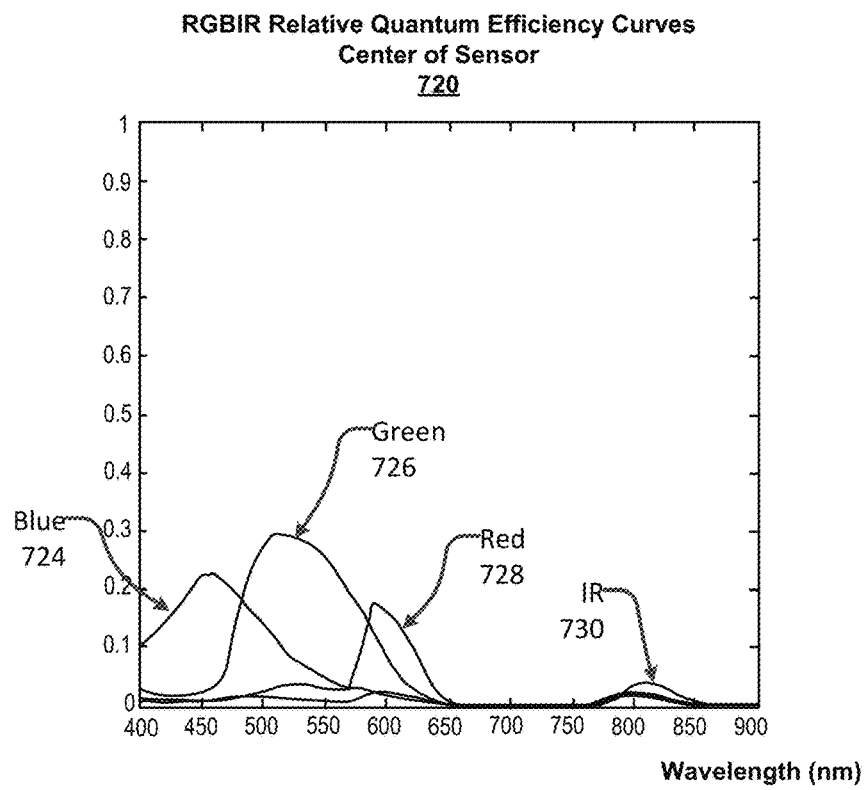
Figure 8:
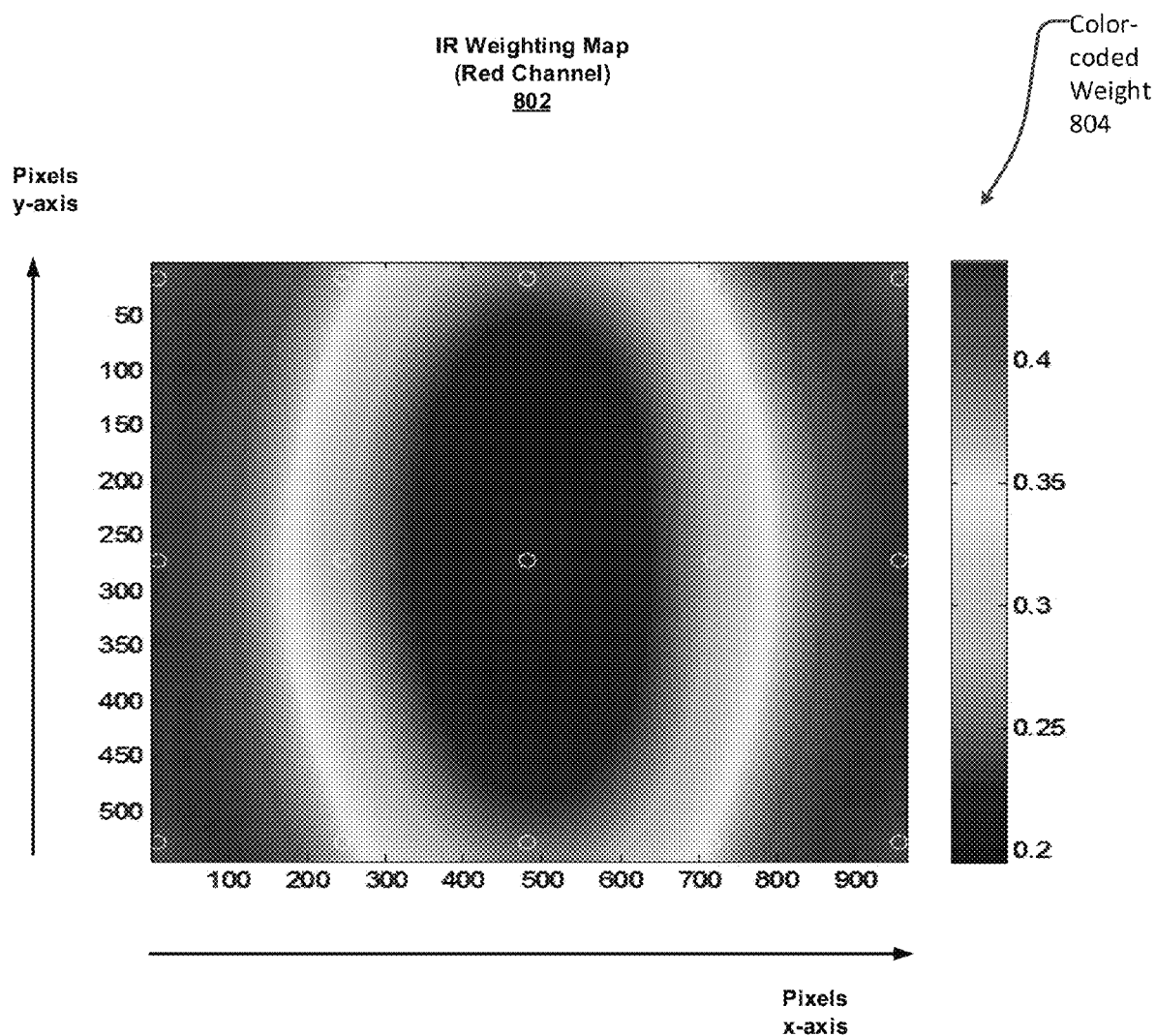
FIG. 8 illustrates an example IR weighting map for the red channel, in accordance with certain embodiments of the present disclosure.

In some embodiments, the IR weighting factors are also based on the spatial location of the pixel within the full resolution frame. For example, weighting may vary from the center to the corners of the frame to compensate for the fact that the IR response is often greater near the center of the frame. FIG. 7 illustrates an example comparison of RGBIR relative quantum efficiency curves for the center 702 and the corner 720 of an RGBIR sensor, in accordance with certain embodiments of the present disclosure. As can be seen, the red 708, green 706, blue, 704, and IR 710 responses at the sensor center are greater than the corresponding responses 728, 726, 724, and 730 at the sensor corner. FIG. 8 illustrates an example IR spatial weighting map 802 for the red channel, in accordance with certain embodiments of the present disclosure. The weights are color coded according to the scale 804 on the right hand side of the figure and may be obtained through a calibration process. Weights near the corners are seen to be larger than weights near the center. Similar weighting maps may be generated for the green and blue channels. In some embodiments, lookup tables may be employed to store these spatial weighting maps and bi-linear interpolation may be used to calculate each pixel's three IR weights (one for each of R, G, and B) based on the pixel's location.

The IR compensation circuit 304 may be configured to correct for IR contamination of the pixels of each of the full resolution red, green, and blue frames, by subtracting from each of the pixels to be corrected, a scaled value of a corresponding pixel from the full resolution IR frame. The scaled value is based on the IR weighting factor associated with the pixel to be corrected. For example:

$$Rc(x,y)=R(x,y)-IW_R(x,y)*IR(x,y)$$

$$Gc(x,y)=G(x,y)-IW_G(x,y)*IR(x,y)$$

$$Bc(x,y)=B(x,y)-IW_B(x,y)*IR(x,y)$$

where R, G, B, and IR are the full resolution pixels; $IW_R$, $IW_G$, and $IW_B$ are the IR weighting factors for the red, green, and blue channels; and Rc, Gc, and Bc, are the corrected color pixels. The resulting color corrected pixels may then be assembled into corrected full resolution RGB image frames 324.

The remosaic circuit 306 may be configured to perform a remosaic operation on the corrected full resolution red, green, and blue frames 324 to generate a stream of color corrected Bayer image frames 114. For example, the Bayer mosaic pixel 122 shown in the top left corner of 114, may be constructed as:

Rc(0,0) Gc(1,0)
Gc(0,1) Bc(1,1)

The Bayer pattern includes twice as many green elements as red and blue elements to mimic the physiology of the human eye.

The IR channel extraction circuit 310 may be configured to split the IR channel from the Mosaic RGBIR stream 110 to generate a separate IR stream 112. The image frames of the IR stream 112 may be generated by selecting only the IR pixels from the RGBIR mosaic.

FIG. 4 illustrates examples of full resolution and mosaic images, in accordance with certain embodiments of the present disclosure. As previously described, the RGBIR mosaic pixels are created by the sensor through CFA masking 130 of the full resolution R, G, B and IR channels. In this illustration, mask elements m1, m3, m4, and m2, are configured to mask the R, G, B, and IR channels, respectively. In other embodiments, different arrangements or layouts of the mask elements are possible. The demosaic circuit 302 is configured to reconstruct and recover the full resolution versions of the channels from the mosaic, as will be described below.

Figure 5:
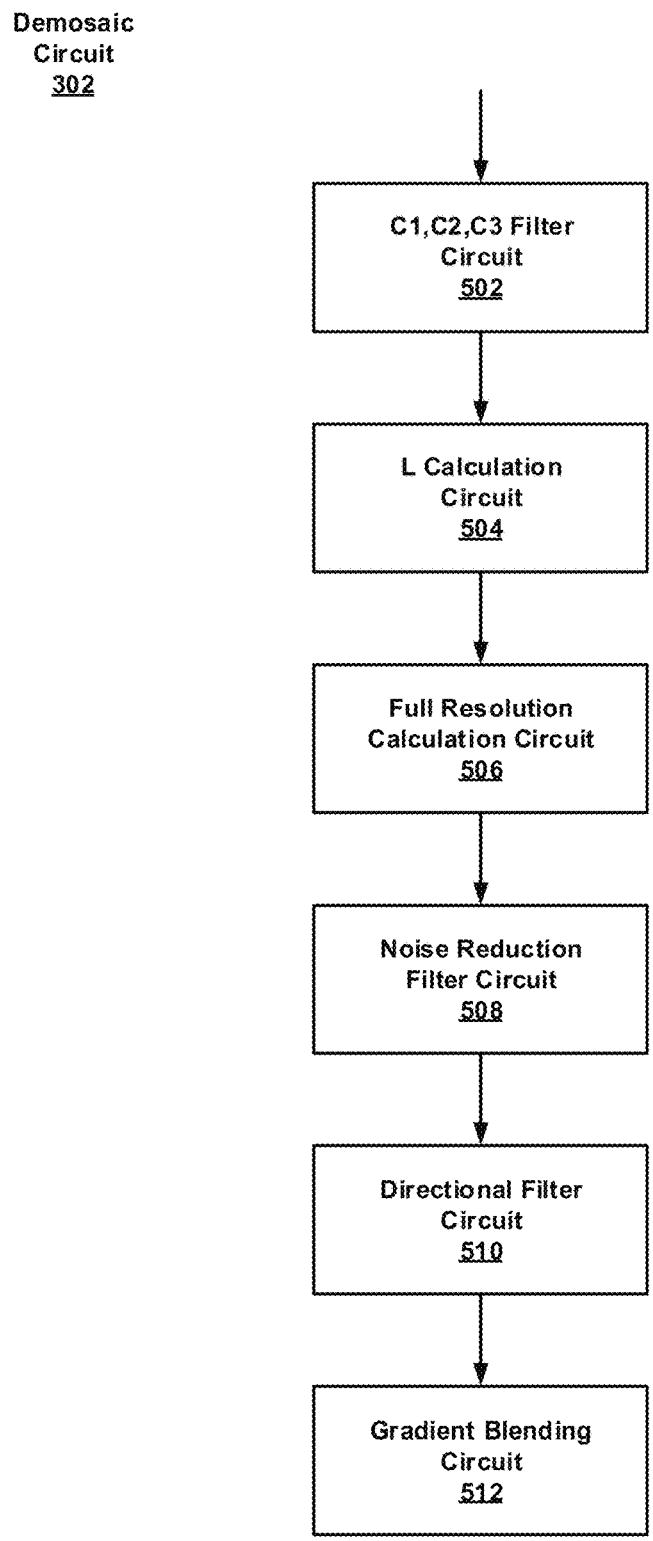
FIG. 5 is a more detailed block diagram of demosaic circuit, configured in accordance with certain embodiments of the present disclosure.

FIG. 5 is a more detailed block diagram of demosaic circuit 302, configured in accordance with certain embodiments of the present disclosure. The demosaic circuit 302 is shown to include a Chroma (C1, C2, C3) filter circuit 502, a Luma (L) calculation circuit 504, a full resolution calculation circuit 506, a noise reduction filter circuit 508, a directional filter circuit 510, and a gradient blending circuit 512. At a high level, the demosaic circuit reconstructs the full resolution R, G, B and IR channels from the mosaic based on high frequency correlations between the channels. These correlations can be derived from a frequency analysis of the CFA pattern as follows. Equation 1 below expresses the relationship between the CFA sampled mosaic image, i(x,y)120, and the full resolution R, G, B, and IR channels 320a, 320b, 320c, and 322, represented by m1, m3, m4, and m2, as:

$$i(x, y) = \frac{1}{4}\begin{bmatrix} m_1(x, y)(1 + (-1)^x)(1 + (-1)^y) + \\ m_2(x, y)(1 - (-1)^x)(1 + (-1)^y) + \\ m_3(x, y)(1 + (-1)^x)(1 - (-1)^y) + \\ m_4(x, y)(1 - (-1)^x)(1 - (-1)^y) \end{bmatrix}$$

This can be algebraically manipulated into the following form (Equation 2):

$$i(x, y) = \frac{1}{4}[((m_1(x, y) + m_2(x, y) + m_3(x, y) + m_4(x, y)) +$$
$$(-1)^x(m_1(x, y) - m_2(x, y) + m_3(x, y) - m_4(x, y)) +$$
$$(-1)^y(m_1(x, y) + m_2(x, y) - m_3(x, y) - m_4(x, y)) +$$
$$(-1)^x(-1)^y(m_1(x, y) - m_2(x, y) - m_3(x, y) + m_4(x, y))]$$

The first term of equation 2 represents the Luma component (L), and the remaining three terms represent Chroma components (C1, C2, C3) of the image, as rewritten in Equation 3:

$$i(x,y)=[L(x,y)+(-1)^x c_1(x,y)+(-1)^y c_2(x,y)+(-1)^x(-1)^y c_3(x,y)]$$

Thus, L, C1, C2, and C3 can be calculated, for each full resolution pixel (x,y), by algebraic combinations of the masked pixels at (x,y) using Equation 4 below, which is written in matrix form:

$$\begin{bmatrix} L \\ c_1 \\ c_2 \\ c_3 \end{bmatrix} = \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}\begin{bmatrix} m_1 \\ m_2 \\ m_3 \\ m_4 \end{bmatrix} = A\begin{bmatrix} m_1 \\ m_2 \\ m_3 \\ m_4 \end{bmatrix}$$

Equation 3 may be recast into the frequency domain (e.g., through a Fourier transform) as shown in Equation 5:

$$I(\omega_x,\omega_y)=[L(\omega_x,\omega_y)+C_1(\omega_x-\pi,\omega_y)+C_2(\omega_x,\omega_y-\pi)+C_3(\omega_x-\pi,\omega_y-\pi)].$$

Figure 6:
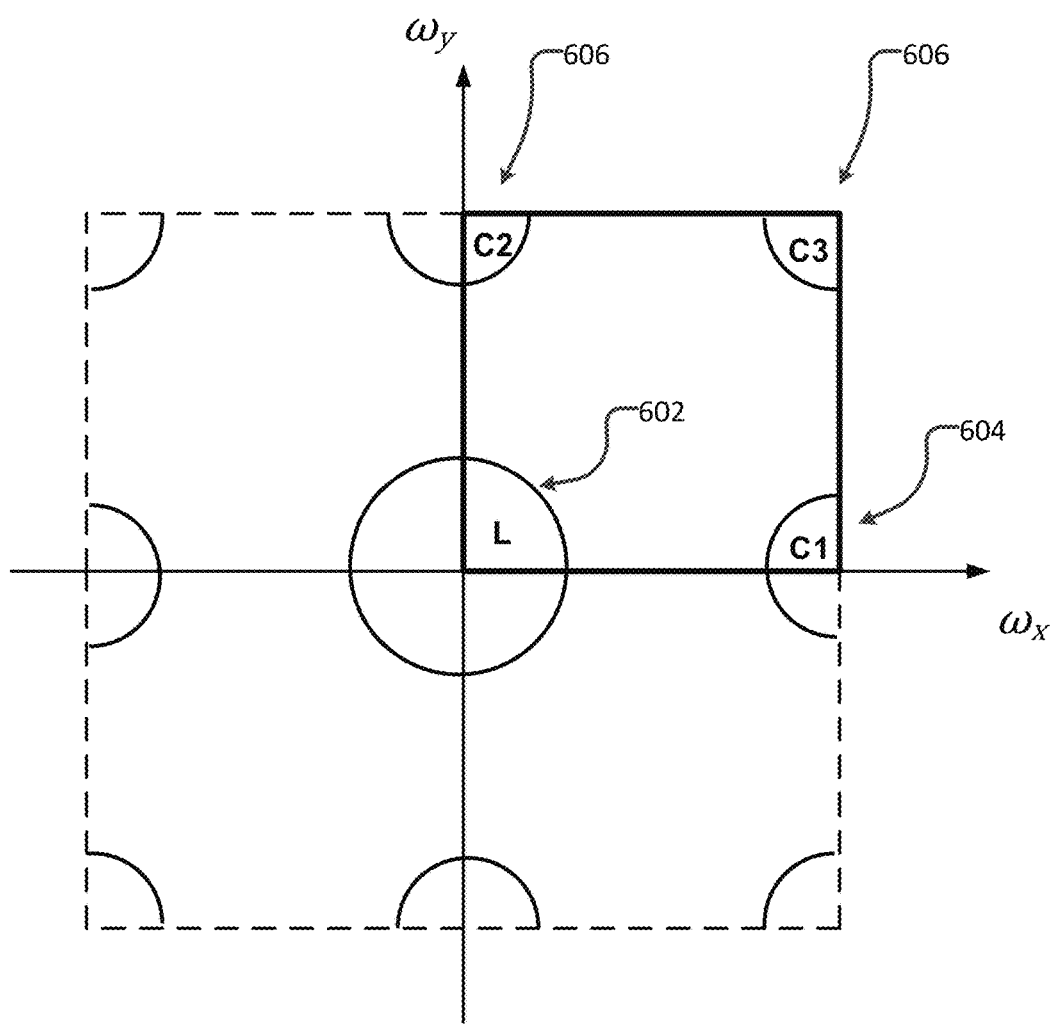
FIG. 6 illustrates an example frequency spectrum of a color filter array sampled image, in accordance with certain embodiments of the present disclosure.

This is illustrated in FIG. 6, which shows an example frequency spectrum 600 of a color filter array sampled image $I(\omega_x, \omega_y)$, in accordance with certain embodiments of the present disclosure. It can be seen that that $I(\omega_x, \omega_y)$ is the sum of $L(\omega_x, \omega_y)$ 602 and the frequency shifted versions of $C_1$, $C_2$, and $C_3$, 604, 606, 608, which are located in the higher frequency range.

The Chroma (C1, C2, C3) filter circuit 502 may be configured to extract the three Chroma components from the RGBIR image frame, for example through the application of high pass filters. In some embodiments, the high pass filters may be constructed by multiplying a low pass filter by a frequency shift factor $(-1)^k|_{k=\{x,y\}}$, where (x,y) is set to (1,0) to filter C1, (0,1) to filter C2, and (1,1) to filter C3. After applying the high pass filter, an additional multiplication by the frequency shift factor shifts the Chroma components down to baseband (lower frequency) so they can be extracted.

The Luma (L) calculation circuit 504 may be configured to subtract the three filtered Chroma image components C1, C2, C3, from the RGBIR image frame to obtain the remaining Luma image component. For example, L=i−C1−C2−C3.

In more detail now, the full resolution calculation circuit 506 may be configured to generate pixels of the full resolution red, green, and blue frames. Having recovered the full resolution L, C1, C2, and C3 components through high pass filtering, the full resolution red, green, and blue frames may be calculated as a weighted combination of the pixels of the Luma image component and the three Chroma image components. This may be accomplished through an inverse of the operation of Equation 4, for example as:

$$A^{-1}\begin{bmatrix} L \\ c_1 \\ c_2 \\ c_3 \end{bmatrix} = \begin{bmatrix} m_1 \\ m_2 \\ m_3 \\ m_4 \end{bmatrix}.$$

This operation can be sensitive, however, to noise and high contrast differences between channels, which can result in artifacts and image degradation. In some embodiments, a number of post-processing operations may be performed to improve results. For example, the noise reduction filter circuit 508 may be configured to average the three Chroma image components of neighboring pixels. In some embodiments, the average may be performed over 8 neighboring pixels.

The directional filter circuit 510 may be configured to apply horizontal and vertical directional interpolation filters to the Luma image component. Because the Luma channel signal L is derived by subtracting C1, C2, and C3 from i(x,y), the resulting L is similar to passing i(x,y) through a low-pass filter without consideration of the interpolation direction, resulting in a rougher edge profile. To overcome the problem, directional filtering is applied to L in the horizontal and vertical direction and the results are blended based on the gradient information. In some embodiments, the directional filters are sized as 3×5 and 5×3 for horizontal and vertical interpolation, respectively. In other words, L is separated into a horizontal and a vertical component:

$$L_H=(I-(C_1(-1)^x+C_2(-1)^y+C_3(-1)^{x+y}))*h_H$$

$$L_V=(I-(C_1(-1)^x+C_2(-1)^y+C_3(-1)^{x+y}))*h_V$$

where, in some embodiments, $$h_H = \frac{1}{64}\begin{bmatrix} 1 & 4 & 6 & 4 & 1 \\ 2 & 8 & 12 & 8 & 2 \\ 1 & 4 & 6 & 4 & 1 \end{bmatrix} = \frac{1}{64}\begin{bmatrix} 1 \\ 2 \\ 1 \end{bmatrix}[1 \quad 4 \quad 6 \quad 4 \quad 1], \text{ and}$$

$$h_V = \text{transpose}(h_H)$$

The gradient blending circuit 512 may be configured to apply horizontal and vertical gradient filters ($grad_h$ and $grad_v$) to blend the directionally filtered Luma image components:

$$L = L_H + \frac{grad_h}{grad_h + grad_v}(L_V - L_H)$$

The gradient filters emphasize edges in the image and may be used to avoid averaging across those edges. In some embodiments, the gradient filters may be generated through a high pass filtering process.

Methodology

Figure 9:
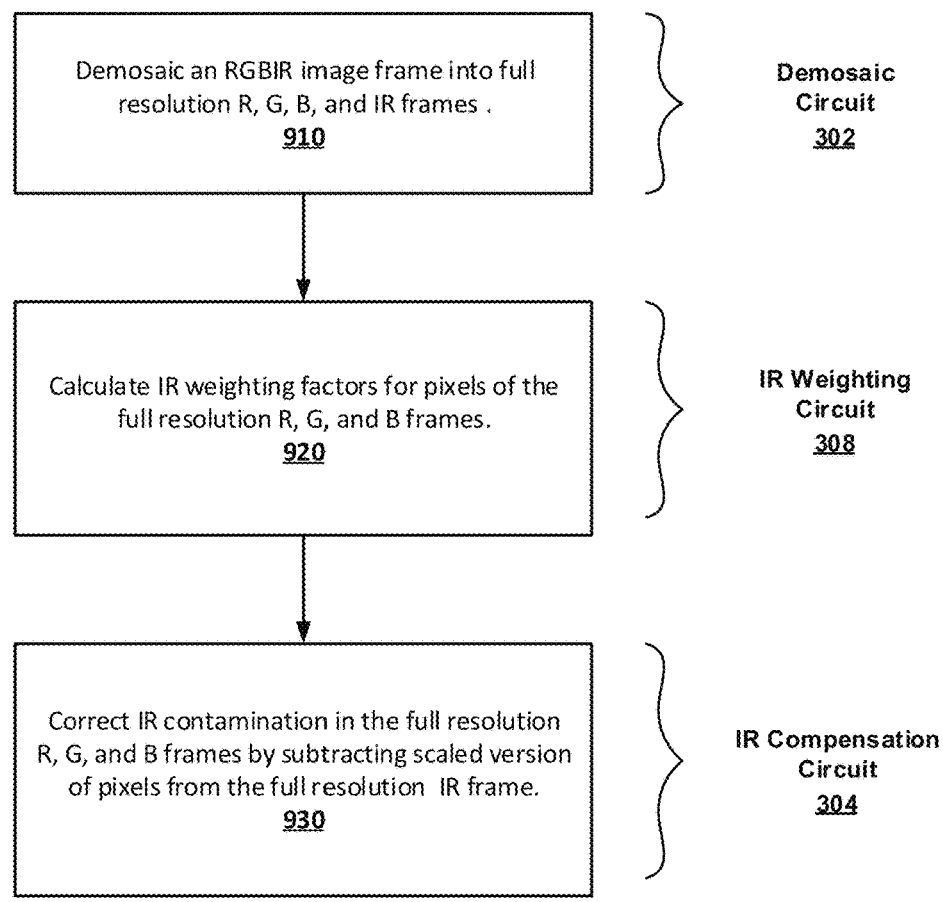
FIG. 9 is a flowchart illustrating a methodology for RGBIR color correction, in accordance with certain embodiments of the present disclosure.

FIG. 9 is a flowchart illustrating an example method 900 for color correction of image frames, received from a hybrid RGBIR sensor, using resolution recovery of the red, green, blue, (RGB) and infra-red (IR) channels, in accordance with certain embodiments of the present disclosure. As can be seen, example method 900 includes a number of phases and sub-processes, the sequence of which may vary from one embodiment to another. However, when considered in the aggregate, these phases and sub-processes form a process for color correction in accordance with certain of the embodiments disclosed herein. These embodiments can be implemented, for example using the system architecture illustrated in FIGS. 3 and 5 described above. However other system architectures can be used in other embodiments, as will be apparent in light of this disclosure. To this end, the correlation of the various functions shown in FIG. 9 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 900. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 9, in one embodiment, method 900 for color correction of image frames received from a hybrid RGBIR sensor, commences at operation 910, by performing a demosaic of the RGBIR image frame. The demosaic process generates a full resolution red frame, a full resolution green frame, a full resolution blue frame, and a full resolution IR frame.

Next, at operation 920, an IR weighting factor is calculated for the pixels of each of the full resolution red, green, and blue frames resulting from the demosaic. In some embodiments, the IR weighting factors are based on a response of red, green, and blue channels of the RGBIR sensor to light in the IR spectrum. In some embodiments, the IR weighting factors are further based on the spatial location of the pixel within the full resolution frame, for example weighting may vary from the center to the corners of the frame.

At operation 930, the pixels of each of the full resolution red, green, and blue frames are corrected for IR contamination. The correction is accomplished by subtracting, from each of the pixels to be corrected, a scaled value of a corresponding pixel from the full resolution IR frame. The scaled value is based on the IR weighting factor associated with the pixel to be corrected.

Of course, in some embodiments, additional operations may be performed, as previously described in connection with the system. For example, the demosaic operation may also include: applying high pass filters to the RGBIR image frame to extract three Chroma image components; subtracting the three Chroma image components from the RGBIR image frame to obtain a Luma image component; and generating pixels of the full resolution red, green, and blue frames as a weighted combination of the pixels of the three Chroma image components and the Luma image component.

Further additional operations may include, for example, performing a remosaic operation on the corrected full resolution red, green, and blue frames to generate a color corrected Bayer image frame.

Example System

Figure 10:
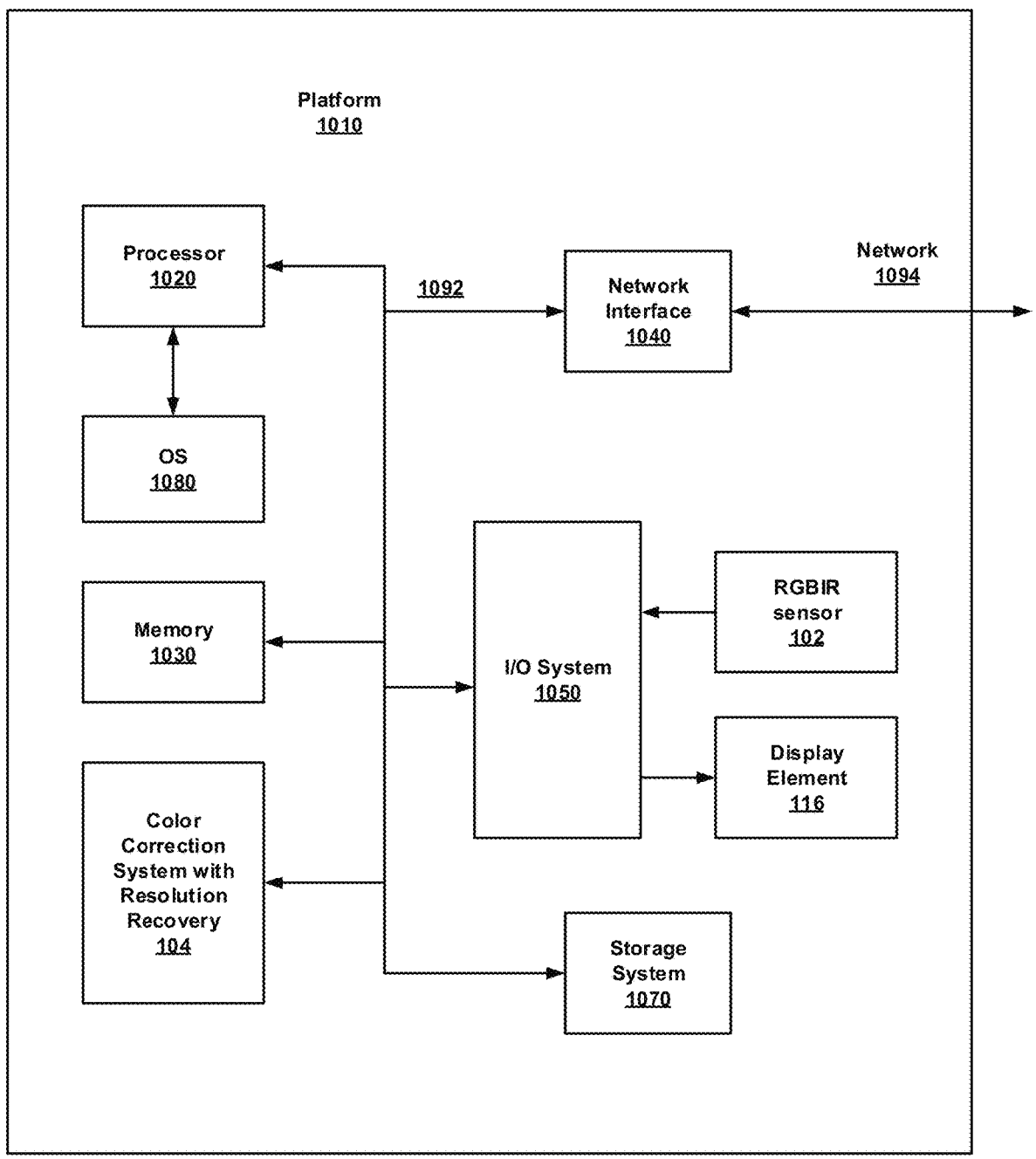
FIG. 10 is a block diagram schematically illustrating a system platform to perform RGBIR color correction, configured in accordance with certain embodiments of the present disclosure.

FIG. 10 illustrates an example system 1000 to perform color correction of a red-green-blue-infrared (RBGIR) image frame received from an RGBIR sensor, configured in accordance with certain embodiments of the present disclosure. In some embodiments, system 1000 comprises a platform 1010 which may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 1010 may comprise any combination of a processor 1020, a memory 1030, color correction system 108, a network interface 1040, an input/output (I/O) system 1050, a hybrid RGBIR sensor 102, a display element 116 and a storage system 1070. As can be further seen, a bus and/or interconnect 1092 is also provided to allow for communication between the various components listed above and/or other components not shown. Platform 1010 can be coupled to a network 1094 through network interface 1040 to allow for communications with other computing devices, platforms or resources. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor or a graphics processing unit, to assist in control and processing operations associated with system 1000. In some embodiments, the processor 1020 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 1000, and therefore may also be implemented using any suitable existing or subsequently-developed platform.

Network interface circuit 1040 can be any appropriate network chip or chipset which allows for wired and/or wireless connection between other components of computer system 1000 and/or network 1094, thereby enabling system 1000 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of computer system 1000. I/O devices may include, but not be limited to, an RGBIR sensor 102, a display element 116, and other devices not shown such as a keyboard, mouse, microphone, speaker, etc.

I/O system 1050 may include a graphics subsystem configured to perform processing of images for display element 116. Graphics subsystem may be a graphics processing unit or a visual processing unit (VPU), for example. An analog or digital interface may be used to communicatively couple graphics subsystem and display element 116. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of platform 1010. In some embodiments, display element 116 may comprise any television type monitor or display. Display element 116 may comprise, for example, a computer display screen, touchscreen display, video monitor, television-like device, and/or a television. Display element 116 may be digital and/or analog. Under the control of the OS 1080 (or one or more software applications), platform 1010 may display color corrected images on display element 116. The images may be provided by a camera that incorporates RGBIR sensor 102 and the color corrected images may be provided by color correction system 104, as described herein.

It will be appreciated that in some embodiments, the various components of the system 1000 may be combined or integrated in a system-on-a-chip (SoC) architecture. In some embodiments, the components may be hardware components, firmware components, software components or any suitable combination of hardware, firmware or software.

Color correction system 104 is configured to provide for color correction of image frames, received from hybrid RGBIR sensor 102, using resolution recovery of the red, green, blue (RGB), and infra-red (IR) channels. The color correction is to compensate for IR contamination of the RGB channels. Color correction system 104 may include any or all of the components illustrated in FIGS. 3 and 5 as described above. Color correction system 104 can be implemented or otherwise used in conjunction with a variety of suitable software and/or hardware that is coupled to or that otherwise forms a part of platform 1010. System 104 can additionally or alternatively be implemented or otherwise used in conjunction with user I/O devices that are capable of providing information to, and receiving information and commands from, a user. These I/O devices may include display element 116, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, color correction system 104 may be installed local to system 1000, as shown in the example embodiment of FIG. 10. Alternatively, system 1000 can be implemented in a client-server arrangement wherein at least some functionality associated with these circuits is provided to system 1000 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 1094 or remotely coupled to network 1094 by one or more other networks and/or communication channels. In some cases access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the color correction methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. In other embodiments the functionalities disclosed herein can be incorporated into other software applications, such as video editing applications, video analysis applications, video surveillance applications, or other content generation, modification, and/or management applications. The computer software applications disclosed herein may include any number of different modules, submodules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for color correction of a red-green-blue-infrared (RBGIR) image frame. The method comprises: performing, by a processor, a demosaic operation on the RGBIR image frame to generate a full resolution red frame, a full resolution green frame, a full resolution blue frame, and a full resolution IR frame, wherein each of the frames comprise a plurality of pixels; calculating, by the processor, an IR weighting factor for the pixels of each of the full resolution red, green, and blue frames; and correcting, by the processor, for IR contamination of the pixels of each of the full resolution red, green, and blue frames, by subtracting from each of the pixels to be corrected, a scaled value of a corresponding pixel from the full resolution IR frame, the scaled value based on the IR weighting factor associated with the pixel to be corrected.

Example 2 includes the subject matter of Example 1, further comprising performing a remosaic operation on the corrected full resolution red, green, and blue frames to generate a color corrected Bayer image frame.

Example 3 includes the subject matter of Examples 1 or 2, wherein the demosaic operation further comprises: applying high pass filters to the RGBIR image frame to extract three Chroma image components; subtracting the three Chroma image components from the RGBIR image frame to obtain a Luma image component; and generating pixels of the full resolution red, green, and blue frames as a weighted combination of the pixels of the three Chroma image components and the Luma image component.

Example 4 includes the subject matter of any of Examples 1-3, wherein the demosaic operation further comprises applying a noise reduction filter to the three Chroma image components, wherein the noise reduction filter averages neighboring pixels.

Example 5 includes the subject matter of any of Examples 1-4, wherein the demosaic operation further comprises applying horizontal and vertical directional interpolation filters to the Luma image component.

Example 6 includes the subject matter of any of Examples 1-5, wherein the demosaic operation further comprises applying a gradient filter to the Luma image component.

Example 7 includes the subject matter of any of Examples 1-6, wherein an RGBIR sensor generates the RGBIR image frame, and the IR weighting factors are based on a response of red, green, and blue channels of the RGBIR sensor to light in the IR spectrum.

Example 8 includes the subject matter of any of Examples 1-7, wherein the IR weighting factors are based on the spatial location of the pixel within the full resolution frame.

Example 9 is a system for color correction of a red-green-blue-infrared (RBGIR) image frame. The system comprises: a demosaic circuit to perform a demosaic operation on the RGBIR image frame to generate a full resolution red frame, a full resolution green frame, a full resolution blue frame, and a full resolution IR frame, wherein each of the frames comprise a plurality of pixels; an IR weighting circuit to calculate an IR weighting factor for the pixels of each of the full resolution red, green, and blue frames; and an IR compensation circuit to correct for IR contamination of the pixels of each of the full resolution red, green, and blue frames, by subtracting from each of the pixels to be corrected, a scaled value of a corresponding pixel from the full resolution IR frame, the scaled value based on the IR weighting factor associated with the pixel to be corrected.

Example 10 includes the subject matter of Example 9, further comprising a remosaic circuit to perform a remosaic operation on the corrected full resolution red, green, and blue frames to generate a color corrected Bayer image frame.

Example 11 includes the subject matter of Examples 9 or 10, wherein the demosaic circuit further comprises: a Chroma filter circuit to high pass filter the RGBIR image frame to extract three Chroma image components; a Luma calculation circuit to subtract the three Chroma image components from the RGBIR image frame to obtain a Luma image component; and full resolution calculation circuit to generate pixels of the full resolution red, green, and blue frames as a weighted combination of the pixels of the three Chroma image components and the Luma image component.

Example 12 includes the subject matter of any of Examples 9-11, wherein the demosaic circuit further comprises a noise reduction filter circuit to average the three Chroma image components of neighboring pixels.

Example 13 includes the subject matter of any of Examples 9-12, wherein the demosaic circuit further comprises a directional filter circuit to apply horizontal and vertical directional interpolation filters to the Luma image component.

Example 14 includes the subject matter of any of Examples 9-13, wherein the demosaic circuit further comprises a gradient blending circuit to apply a gradient filter to the Luma image component.

Example 15 includes the subject matter of any of Examples 9-14, wherein an RGBIR sensor generates the RGBIR image frame, and the IR weighting factors are based on a response of red, green, and blue channels of the RGBIR sensor to light in the IR spectrum.

Example 16 includes the subject matter of any of Examples 9-15, wherein the IR weighting factors are based on the spatial location of the pixel within the full resolution frame.

Example 17 is at least one non-transitory computer readable storage medium having instructions encoded thereon that, when executed by one or more processors, result in the following operations for color correction of a red-green-blue-infrared (RBGIR) image frame. The operations comprise: performing a demosaic operation on the RGBIR image frame to generate a full resolution red frame, a full resolution green frame, a full resolution blue frame, and a full resolution IR frame, wherein each of the frames comprise a plurality of pixels; calculating an IR weighting factor for the pixels of each of the full resolution red, green, and blue frames; and correcting for IR contamination of the pixels of each of the full resolution red, green, and blue frames, by subtracting from each of the pixels to be corrected, a scaled value of a corresponding pixel from the full resolution IR frame, the scaled value based on the IR weighting factor associated with the pixel to be corrected.

Example 18 includes the subject matter of Example 17, the operations further comprising performing a remosaic operation on the corrected full resolution red, green, and blue frames to generate a color corrected Bayer image frame.

Example 19 includes the subject matter of Examples 17 or 18, wherein the demosaic operation further comprises: applying high pass filters to the RGBIR image frame to extract three Chroma image components; subtracting the three Chroma image components from the RGBIR image frame to obtain a Luma image component; and generating pixels of the full resolution red, green, and blue frames as a weighted combination of the pixels of the three Chroma image components and the Luma image component.

Example 20 includes the subject matter of any of Examples 17-19, wherein the demosaic operation further comprises applying a noise reduction filter to the three Chroma image components, wherein the noise reduction filter averages neighboring pixels.

Example 21 includes the subject matter of any of Examples 17-20, wherein the demosaic operation further comprises applying horizontal and vertical directional interpolation filters to the Luma image component.

Example 22 includes the subject matter of any of Examples 17-21, wherein the demosaic operation further comprises applying a gradient filter to the Luma image component.

Example 23 includes the subject matter of any of Examples 17-22, wherein an RGBIR sensor generates the RGBIR image frame, and the IR weighting factors are based on a response of red, green, and blue channels of the RGBIR sensor to light in the IR spectrum.

Example 24 includes the subject matter of any of Examples 17-23, wherein the IR weighting factors are based on the spatial location of the pixel within the full resolution frame.

Example 25 is a system for color correction of a red-green-blue-infrared (RBGIR) image frame. The system comprises: means for performing a demosaic operation on the RGBIR image frame to generate a full resolution red frame, a full resolution green frame, a full resolution blue frame, and a full resolution IR frame, wherein each of the frames comprise a plurality of pixels; means for calculating an IR weighting factor for the pixels of each of the full resolution red, green, and blue frames; and means for correcting for IR contamination of the pixels of each of the full resolution red, green, and blue frames, by subtracting from each of the pixels to be corrected, a scaled value of a corresponding pixel from the full resolution IR frame, the scaled value based on the IR weighting factor associated with the pixel to be corrected.

Example 26 includes the subject matter of Example 25, further comprising means for performing a remosaic operation on the corrected full resolution red, green, and blue frames to generate a color corrected Bayer image frame.

Example 27 includes the subject matter of Examples 25 or 26, wherein the demosaic operation further comprises: means for applying high pass filters to the RGBIR image frame to extract three Chroma image components; means for subtracting the three Chroma image components from the RGBIR image frame to obtain a Luma image component; and means for generating pixels of the full resolution red, green, and blue frames as a weighted combination of the pixels of the three Chroma image components and the Luma image component.

Example 28 includes the subject matter of any of Examples 25-27, wherein the demosaic operation further comprises means for applying a noise reduction filter to the three Chroma image components, wherein the noise reduction filter averages neighboring pixels.

Example 29 includes the subject matter of any of Examples 25-28, wherein the demosaic operation further comprises means for applying horizontal and vertical directional interpolation filters to the Luma image component.

Example 30 includes the subject matter of any of Examples 25-29, wherein the demosaic operation further comprises means for applying a gradient filter to the Luma image component.

Example 31 includes the subject matter of any of Examples 25-30, wherein an RGBIR sensor generates the RGBIR image frame, and the IR weighting factors are based on a response of red, green, and blue channels of the RGBIR sensor to light in the IR spectrum.

Example 32 includes the subject matter of any of Examples 25-31, wherein the IR weighting factors are based on the spatial location of the pixel within the full resolution frame.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for color correction of a red-green-blue-infrared (RBGIR) image frame, the method comprising:
    performing, by a processor, a demosaic operation on the RGBIR image frame to generate a full resolution red frame, a full resolution green frame, a full resolution blue frame, and a full resolution IR frame, wherein each of the frames comprise a plurality of pixels;
    calculating, by the processor, an IR weighting factor for one or more of the pixels of each of the full resolution red, green, and blue frames, wherein a value of each of the IR weighting factors is affected by a location of the corresponding pixel in its respective full resolution frame; and
    correcting, by the processor, for IR contamination of the pixels of each of the full resolution red, green, and blue frames, by subtracting from each of the pixels to be corrected, a scaled value of a corresponding pixel from the full resolution IR frame, the scaled value based on the IR weighting factor associated with the pixel to be corrected.

2. The method of claim 1, further comprising performing a remosaic operation on the corrected full resolution red, green, and blue frames to generate a color corrected Bayer image frame.

3. The method of claim 1, wherein the demosaic operation further comprises:
    applying high pass filters to the RGBIR image frame to extract three Chroma image components;
    subtracting the three Chroma image components from the RGBIR image frame to obtain a Luma image component; and
    generating pixels of the full resolution red, green, and blue frames as a weighted combination of the pixels of the three Chroma image components and the Luma image component.

4. The method of claim 3, wherein the demosaic operation further comprises applying a noise reduction filter to the three Chroma image components, wherein the noise reduction filter averages neighboring pixels.

5. The method of claim 3, wherein the demosaic operation further comprises applying horizontal and vertical directional interpolation filters to the Luma image component.

6. The method of claim 3, wherein the demosaic operation further comprises applying a gradient filter to the Luma image component.

7. The method of claim 1, wherein an RGBIR sensor generates the RGBIR image frame, and the IR weighting factors are based on a response of red, green, and blue channels of the RGBIR sensor to light in the IR spectrum.

8. The method of claim 1, wherein the IR weighting factors are largest for those pixels located near the corners of the corresponding full resolution frame.

9. A system for color correction of a red-green-blue-infrared (RBGIR) image frame, the system comprising:
    a demosaic circuit configured to perform a demosaic operation on the RGBIR image frame to generate a full resolution red frame, a full resolution green frame, a full resolution blue frame, and a full resolution IR frame, wherein each of the frames comprise a plurality of pixels;
    an IR weighting circuit configured to calculate an IR weighting factor for one or more of the pixels of each of the full resolution red, green, and blue frames, wherein a value of each of the IR weighting factors is affected by a location of the corresponding pixel in its respective full resolution frame; and
    an IR compensation circuit configured to correct for IR contamination of the pixels of each of the full resolution red, green, and blue frames, by subtracting from each of the pixels to be corrected, a scaled value of a corresponding pixel from the full resolution IR frame, the scaled value based on the IR weighting factor associated with the pixel to be corrected.

10. The system of claim 9, further comprising a remosaic circuit configured to perform a remosaic operation on the corrected full resolution red, green, and blue frames to generate a color corrected Bayer image frame.

11. The system of claim 9, wherein the demosaic circuit further comprises:
    a Chroma filter circuit configured to high pass filter the RGBIR image frame to extract three Chroma image components;
    a Luma calculation circuit configured to subtract the three Chroma image components from the RGBIR image frame to obtain a Luma image component; and
    full resolution calculation circuit configured to generate pixels of the full resolution red, green, and blue frames as a weighted combination of the pixels of the three Chroma image components and the Luma image component.

12. The system of claim 11, wherein the demosaic circuit further comprises a noise reduction filter circuit configured to average the three Chroma image components of neighboring pixels.

13. The system of claim 11, wherein the demosaic circuit further comprises a directional filter circuit configured to apply horizontal and vertical directional interpolation filters to the Luma image component.

14. The system of claim 11, wherein the demosaic circuit further comprises a gradient blending circuit configured to apply a gradient filter to the Luma image component.

15. The system of claim 9, wherein an RGBIR sensor generates the RGBIR image frame, and the IR weighting factors are based on a response of red, green, and blue channels of the RGBIR sensor to light in the IR spectrum.

16. The system of claim 9, wherein the IR weighting factors are largest for those pixels located near the corners of the corresponding full resolution frame.

17. At least one non-transitory computer readable storage medium having instructions encoded thereon that, when executed by one or more processors, result in the following operations for color correction of a red-green-blue-infrared (RBGIR) image frame, the operations comprising:

performing a demosaic operation on the RGBIR image frame to generate a full resolution red frame, a full resolution green frame, a full resolution blue frame, and a full resolution IR frame, wherein each of the frames comprise a plurality of pixels;

calculating an IR weighting factor for one or more of the pixels of each of the full resolution red, green, and blue frames, wherein a value of each of the IR weighting factors is affected by a location of the corresponding pixel in its respective full resolution frame; and correcting for IR contamination of the pixels of each of the full resolution red, green, and blue frames, by subtracting from each of the pixels to be corrected, a scaled value of a corresponding pixel from the full resolution IR frame, the scaled value based on the IR weighting factor associated with the pixel to be corrected.

18. The computer readable storage medium of claim 17, the operations further comprising performing a remosaic operation on the corrected full resolution red, green, and blue frames to generate a color corrected Bayer image frame.

19. The computer readable storage medium of claim 17, wherein the demosaic operation further comprises:

applying high pass filters to the RGBIR image frame to extract three Chroma image components;

subtracting the three Chroma image components from the RGBIR image frame to obtain a Luma image component; and generating pixels of the full resolution red, green, and blue frames as a weighted combination of the pixels of the three Chroma image components and the Luma image component.

20. The computer readable storage medium of claim 19, wherein the demosaic operation further comprises applying a noise reduction filter to the three Chroma image components, wherein the noise reduction filter averages neighboring pixels.

21. The computer readable storage medium of claim 19, wherein the demosaic operation further comprises applying horizontal and vertical directional interpolation filters to the Luma image component.

22. The computer readable storage medium of claim 19, wherein the demosaic operation further comprises applying a gradient filter to the Luma image component.

23. The computer readable storage medium of claim 17, wherein an RGBIR sensor generates the RGBIR image frame, and the IR weighting factors are based on a response of red, green, and blue channels of the RGBIR sensor to light in the IR spectrum.

24. The computer readable storage medium of claim 17, wherein the IR weighting factors are largest for those pixels located near the corners of the corresponding full resolution frame.

* * * * *